United States Patent
Kaneko (10) Patent No.: US 12,435,430 B2
(45) Date of Patent: Oct. 7, 2025

(54) ELECTRODE MATERIAL, MEMBRANE ELECTRODE ASSEMBLY, CO₂ ELECTROLYSIS DEVICE, AND METHOD FOR PRODUCING CO₂ ELECTROLYSIS PRODUCT

(71) Applicant: IDEMITSU KOSAN CO., LTD., Chiyoda-ku (JP)

(72) Inventor: Hiroyuki Kaneko, Tokyo (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 36 days.

(21) Appl. No.: 18/550,400

(22) PCT Filed: Mar. 8, 2022

(86) PCT No.: PCT/JP2022/010130
§ 371 (c)(1),
(2) Date: Sep. 13, 2023

(87) PCT Pub. No.: WO2022/196461
PCT Pub. Date: Sep. 22, 2022

(65) Prior Publication Data
US 2024/0158929 A1    May 16, 2024

(30) Foreign Application Priority Data
Mar. 19, 2021   (JP) .................................. 2021-046538

(51) Int. Cl.
*C25B 3/26*    (2021.01)
*C25B 9/23*    (2021.01)
(Continued)

(52) U.S. Cl.
CPC .................. *C25B 3/26* (2021.01); *C25B 9/23* (2021.01); *C25B 11/054* (2021.01); *C25B 13/08* (2013.01)

(58) Field of Classification Search
CPC ........... C25B 3/26; C25B 9/23; C25B 11/054; C25B 13/08
See application file for complete search history.

(56) References Cited

U.S. PATENT DOCUMENTS

| 2004/0101740 A1* | 5/2004 | Sanders ................ H01M 50/70 |
| | | 429/444 |
| 2011/0207028 A1 | 8/2011 | Fukuta et al. |

(Continued)

FOREIGN PATENT DOCUMENTS

| DE | 102020207192 A1 | 12/2021 |
| JP | 2010-92660 A | 4/2010 |

(Continued)

OTHER PUBLICATIONS

International Search Report Issued May 17, 2022, in PCT/JP2022/010130, filed on Mar. 8, 2022, 2 pages.

(Continued)

*Primary Examiner* — Ciel P Contreras
(74) *Attorney, Agent, or Firm* — Oblon, McClelland, Maier &Neustadt, L.L.P.

(57) ABSTRACT

An electrode material containing a carrying body and an anion exchange resin. The carrying body includes a conductive carrier and a catalyst, the catalyst is supported on the conductive carrier, and the catalyst includes one or a plurality of particles selected from a metal complex, a metal, and an inorganic compound. The anion exchange resin covers a part or all of a surface of the carrying body, the anion exchange resin includes an ionomer containing one or a plurality of groups selected from a primary amino group, a secondary amino group, a tertiary amino group, and a quaternary ammonium group, and a basic site density of the ionomer is 2.0 mmol/cm³ or more and 5.0 mmol/cm³ or less.

20 Claims, 3 Drawing Sheets

(51) Int. Cl.
*C25B 11/054* (2021.01)
*C25B 13/08* (2006.01)

(56) References Cited

U.S. PATENT DOCUMENTS

| | | |
|---|---|---|
| 2017/0037522 A1* | 2/2017 | Kaczur .................. B01J 41/14 |
| 2017/0321333 A1 | 11/2017 | Kuhl et al. |
| 2017/0321334 A1 | 11/2017 | Kuhl et al. |
| 2019/0001258 A1 | 1/2019 | Manabe et al. |
| 2020/0308718 A1 | 10/2020 | Patru et al. |
| 2020/0354843 A1 | 11/2020 | Kuhl et al. |
| 2021/0164116 A1 | 6/2021 | Kuhl et al. |
| 2021/0164117 A1 | 6/2021 | Fujinuma |

FOREIGN PATENT DOCUMENTS

| | | |
|---|---|---|
| JP | 2019-11492 A | 1/2019 |
| JP | WO 2019/065258 A1 | 4/2019 |
| JP | 2019-515142 A | 6/2019 |
| WO | WO-2020247472 A1 * | 12/2020 ............. B01D 69/02 |

OTHER PUBLICATIONS

S. Ren et al. "Molecular electrocatalysts can mediate fast, selective CO2 reduction in a flow cell", Science, 2019, 365, 367-369, 4 pages.
International Preliminary Report on Patentability and Written Opinion issued Sep. 28, 2023 in PCT/JP2022/010130, (submitting English translation only), 6 pages.
Office Action issued Dec. 10, 2024 in corresponding German Application No. 112022001617.5 (with English-language Translation), 8 pages.

* cited by examiner

ELECTRODE MATERIAL, MEMBRANE ELECTRODE ASSEMBLY, $CO_2$ ELECTROLYSIS DEVICE, AND METHOD FOR PRODUCING $CO_2$ ELECTROLYSIS PRODUCT

CROSS REFERENCE TO RELATED APPLICATIONS

This application is a National Stage entry under 35 U.S.C. § 371 of PCT/JP2022/010130, filed on Mar. 8, 2022, and claims priority to Japanese Patent Application No. 2021-046538, filed on Mar. 19, 2021. The entire contents of both are incorporated herein by reference.

TECHNICAL FIELD

The present disclosure relates to an electrode material, a membrane-electrode assembly, a $CO_2$ electrolytic device and a method for producing $CO_2$ electrolysis product.

BACKGROUND ART

Fossil fuels (oil, coal, natural gas) have been supporting the modern energy-consuming society. The extraction of energy from fossil fuels involves the emission of $CO_2$. An increase in the concentration of carbon dioxide in the atmosphere is said to be one of the causes of global warming, and a reduction thereof is required. Since $CO_2$ is an extremely stable material, it is difficult to reuse it by decomposition or the like, and a new technology for converting $CO_2$ into other materials and reusing it as a resource is required.

As one of such technologies, research on $CO_2$ utilizing electrical energy has been widely conducted throughout the world. The $CO_2$ reduction device having the polymer electrolyte-type electrolytic cell has been found to be superior to other devices in that the transport resistance of ions can be sufficiently lowered by using a thin film of polymer electrolyte. In general, the cathode for $CO_2$ reduction used for polymer electrolyte-type electrolytic cell contains fine catalyst particles and conductive carriers.

In $CO_2$ reduction, the amount of $CO_2$ adsorption in the vicinity of the $CO_2$ reduction catalyst strongly contributes to the production efficiency of the reduction products such as CO (carbon monoxide), and it is desirable to develop an electrode catalyst capable of adsorbing a large amount of $CO_2$. For example, a method has been proposed in which a compound having a property of interacting with $CO_2$ by adsorption or the like is co-supported on electrodes together with a catalyst to increase the adsorption amount of weakly acidic $CO_2$ and improve the production efficiency. (Patent Literatures 1 and 2 and Non Patent Literature 1)

CITATION LIST

Patent Literature

Patent Literature 1: JP 2019-011492 A
Patent Literature 2: JPWO 2019/065258 A1

Non Patent Literature

Non Patent Literature 1: S. Ren, D. Joulie, D. Salvatore, K. Torbensen, M. Wang, M. Robert, C. P. Berlinguette, Science, 2019, 365, 367-369.

SUMMARY OF INVENTION

Technical Problem

In these prior arts, under the condition that the supplying partial pressure of $CO_2$ (i.e., $CO_2$ concentration) is low, it is difficult to retain a large amount of $CO_2$ having a low concentration in the vicinity of the reduction catalyst, and there is a concern that the production efficiency of the reduction product and the $CO_2$ conversion rate of $CO_2$ electrolytic device may be lowered.

In addition, when a carbon dioxide reduction membrane containing a proton permeable polymer which is a cation exchange resin is used as an electrode on the cathode side as in the carbon dioxide reduction device disclosed in Patent Literature 1, since the cation exchange resin is acidic, a side reaction (hydrogen generation reaction, which is easier to proceed under acidic conditions) is likely to occur. Further, since the cation exchange resin is acidic, there is no $CO_2$ adsorption ability, and there is a concern that the ion conductivity and the $CO_2$ adsorption ability cannot be achieved at the same time. This is also clear from the fact that according to the data shown in Reference Example 5 (paragraph 0061) of Patent Literature 1, addition of Nafion, which is a cation exchange resin, reduces the adsorption amount of $CO_2$.

In addition, since the cation exchange resin is permeable to metal ions, deposition of electrolyte salt is likely to occur, and when the deposited salt is accumulated, there is a concern that the carbon dioxide electrolysis efficiency may be lowered.

Solution to Problem

Thus, the object of the present disclosure is to solve the problem of providing a technology related to an electrode material which is excellent in the production efficiency of producing a reduction product (CO or the like) from $CO_2$, and more excellent in the production efficiency of producing the reduction product particularly when the supply concentration of $CO_2$ is low.

The present inventors have focused on the fact that since the anion exchange resin is basic, the side reaction is less likely to occur, and metal ions are less likely to permeate, thus the salt deposition rate is slow, and have conducted diligent study toward the realization of the above-mentioned objective. As a result, the inventors have found that the problem can be solved by using a carrying body which contains the catalyst and the conductive carrier and is covered by a specific anion exchange resin as the electrode material, and have completed the technology according to the present disclosure. That is, the technology according to the present disclosure is as follows.

According to one aspect of the present disclosure, it is possible to provide a technology related to an electrode material including:
  a carrying body that includes a conductive carrier and a catalyst which is supported on the conductive carrier, the catalyst including one or a plurality of types of particles of a metal complex, a metal, and an inorganic compound; and
  an anion exchange resin that covers a part or all of a surface of the carrying body, and includes an ionomer which includes one or a plurality of types of groups among a primary amino group, a secondary amino group, a tertiary amino group, and a quaternary ammonium group, a basic site density of the ionomer being 2.0 mmol/cm³ or more and 5.0 mmol/cm³ or less.

Advantageous Effects of Invention

According to the present disclosure, it is possible to provide a technology related to an electrode material which is excellent in the production efficiency of producing a reduction product (CO or the like) from $CO_2$, and more excellent in the production efficiency of producing the reduction product particularly when the supply concentration of $CO_2$ is low.

DESCRIPTION OF EMBODIMENTS

Hereinafter, an electrode material, a membrane-electrode assembly, and a $CO_2$ electrolytic device according to the present disclosure will be described in detail. The technique according to the present disclosure is not limited to the embodiment described below. In addition, in the present disclosure, the term "to" relating to the description of a numerical value is a term indicating a lower limit value or more and an upper limit value or less.

1. Electrode Material

Figure 1:
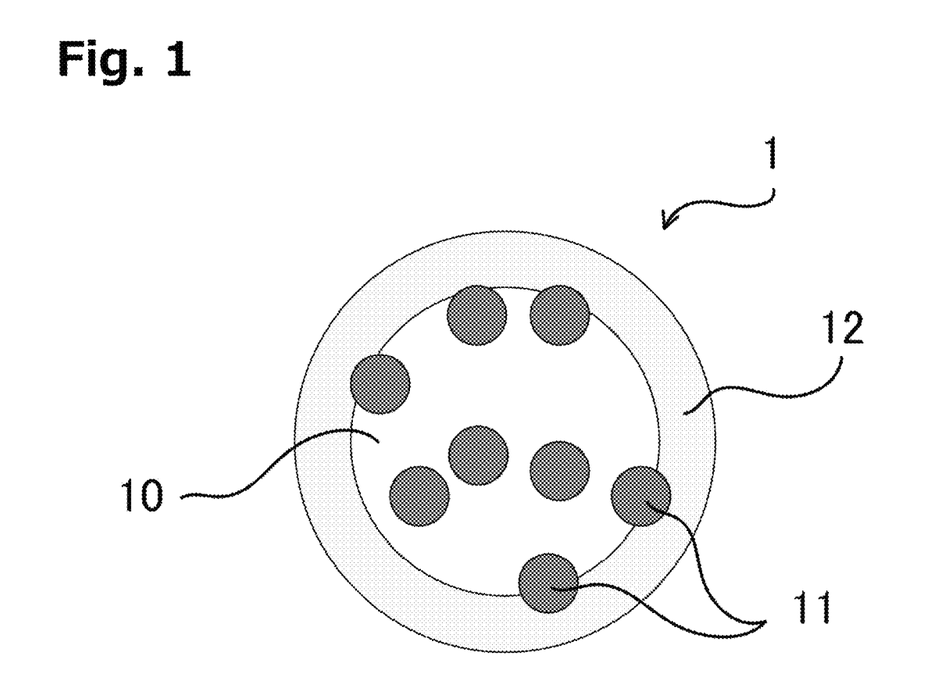
FIG. 1 is a schematic diagram illustrating an electrode material according to the present disclosure.

The electrode material according to the present disclosure mainly includes a catalyst, a conductive carrier, and an anion exchange resin. The catalyst is supported by the conductive carrier to form a carrying body. The anion exchange resin covers a part or all of the surface of the carrying body (see FIG. 1).

1-1. Conductive Carrier

The conductive carrier according to the present disclosure preferably includes a carbon material, titanium, tantalum, gold, silver or copper. One of these materials may be used alone, or a plurality of these materials may be used in combination. These materials can be selected in consideration of corrosion resistance. It is preferable that the conductive carrier is of a material different from the catalyst.

Here, the carbon material is not particularly limited as long as it has conductivity and does not impair the effect of the technology according to the present disclosure. As the carbon material, materials known to be used for electrode material can be used, for example, graphite carbon, glassy carbon, carbon black, graphene, carbon nanotube, or the like can be used.

It is preferable that the conductive carrier is in a particulate form or a staple fiber form. Furthermore, the conductive carrier may be an agglomerate in which particles (primary particles) or staple fibers are agglomerated. Here, the particulate form or the staple fiber form is determined to be a particulate form or a staple fiber form on the basis of common technical knowledge. In addition, according to the present disclosure, the agglomerate in which staple fibers are agglomerated is also included in secondary particles.

The average particle diameter of the particles or the average fiber length of the staple fibers of the conductive carrier is not particularly limited as long as the effect of the technology according to the present disclosure is not impaired, and may be in a range of, for example, 10 nm to 1000 μm. The average particle diameter and the average fiber length of the conductive carrier can be freely selected considering the surface area and the porosity of the conductive carrier. Here, the average particle diameter is an average diameter of particles which include the primary particles or staple fibers and the secondary particles. Here, when the conductive carrier is in the staple fiber form, the average particle diameter is a value obtained by averaging a particle diameter in a case when the fiber length of the staple fiber is regarded as a primary particle diameter and a particle diameter of the secondary particle of the staple fiber. The average particle diameter can be measured by measuring the diameters of 50 randomly selected particles using a known observation means such as an optical microscope, a scanning electron microscope, or a transmission electron microscope, and calculating the average value. The observation means can be selected according to the average particle diameter. Furthermore, it is preferable that the average primary particle diameter of the conductive carrier is twice or more the average primary particle diameter of the catalyst.

1-2. Catalyst

The catalyst according to the present disclosure is supported by the conductive carrier to form the carrying body.

The catalyst is a known catalyst capable of reducing carbon dioxide, and includes one or a plurality of types of particles, such as: particles of metals such as gold, silver, copper, nickel, iron, cobalt, zinc, chromium, palladium, tin, manganese, aluminum, indium, bismuth, and molybdenum; particles of inorganic compounds such as tin oxide, copper oxide, and carbon nitride; and particles of metal complexes of copper, nickel, iron, cobalt, zinc, manganese, molybdenum, rhenium, tin, indium, lead, ruthenium, and aluminum. These materials can be selected in consideration of corrosion resistance.

The catalyst is mainly in a particulate form. In addition, the catalyst may be secondary particles in which particles (primary particles) are agglomerated. Here, the particulate form is not limited to those forms which are determined to be a particulate form on the basis of common technical knowledge, but also includes those forms in the case when the catalyst is very small and the coordinate-bonded metal is highly dispersed at the atomic level and is called "single-atom catalyst".

The average particle diameter of the particles of the catalyst is not particularly limited as long as the effect of the technology according to the present disclosure is not impaired, and may be in a range of, for example, 0.001 μm to 100 μm, preferably 0.001 μm to 1 μm, and more preferably 0.001 μm to 0.1 μm. The particle diameter of the catalyst can be freely selected considering the surface area of the catalyst and the size effect of the catalyst. Since the surface area of the catalyst increases as the particle diameter of the catalyst increases, there is an effect that the number of active sites at which the catalyst contributes to the reaction increases. On the other hand, depending on the particle diameter of the catalyst, apart from the effect of the surface area, there is also an effect called a size effect by which the activity and selectivity are greatly changed. Therefore, the particle diameter of the catalyst may be selected by confirming the activity of the catalyst with the device being used. The average primary particle diameter of the catalyst related to the reduction reaction of carbon dioxide is more effective when the diameter is smaller due to the size effect, and thus, with respect to the technology according to the present disclosure, the average primary particle diameter of the catalyst is preferably equal to or less than 50 nm, and more preferably equal to or less than 20 nm. In addition, it is preferable that the catalyst is not agglomerated but dispersed, that is, it is preferable that the amount of the primary particles contained is large because the effect of the catalyst is high. Here, the average particle diameter of the catalyst is an average diameter of particles including the primary particles and the secondary particles of the catalyst. Furthermore, the average primary particle is an average particle diameter of only the primary particle diameters. These average (or primary) particle diameters can be measured by measuring the diameters of 50 randomly selected particles (or primary particles) using a known observation means such as an optical microscope, a scanning electron microscope, or a transmission electron microscope, and calculating the average value. The observation means can be selected according to the average (or primary) particle diameter.

The supported amount on the conductive carrier of the catalyst is not particularly limited as long as the effect of the technology according to the present disclosure is not impaired. For example, when the total amount of the carrying body is 100% by mass, the amount of the catalyst in the carrying body can be 10% by mass or more, 20% by mass or more, 30% by mass or more, or 40% by mass or more, and can be 70% by mass or less, 60% by mass or less, or 50% by mass or less. When the supported amount of the catalyst is in such a range, the agglomeration of the catalyst can be suppressed and the catalytic activity can be maintained at a high level.

1-3. Anion Exchange Resin

The anion exchange resin according to the present disclosure covers a part or all of the surface of the carrying body comprising the catalyst and the conductive carrier.

The anion exchange resin according to the present disclosure is an ionomer including an amino group or a quaternary ammonium group. That is, the anion exchange resin has a structure in which a structure having an amino group or a quaternary ammonium group is added to the base resin of the ionomer. Here, the amino group includes the primary amino group, the secondary amino group, and the tertiary amino group.

The basic site density of the anion exchange resin (ionomer) is 2.0 mmol/cm$^3$ or more and 5.0 mmol/cm$^3$ or less, preferably 2.5 mmol/cm$^3$ or more and less than 4.5 mmol/cm$^3$, and more preferably 2.9 mmol/cm$^3$ or more and less than 4.5 mmol/cm$^3$. In a case where the basic site density of the anion exchange resin is within such a range, an electrode material having an excellent $CO_2$ reduction efficiency can also be obtained when the $CO_2$ concentration at the periphery portion of the electrode material is low.

When the carrying body in which the catalyst is supported on the conductive carrier is not covered with the anion exchange resin or when the carrying body is covered with the anion exchange resin but the basic site concentration of the anion exchange resin is low, since the $CO_2$ supplied to the electrode material is a gas and can move freely, the opportunity for the $CO_2$ to be adsorbed to the active sites of the catalyst is limited, and therefore the $CO_2$ reduction efficiency is also limited.

On the other hand, when the carrying body is covered with the anion exchange resin and the basic site concentration of the anion exchange resin is equal to or higher than a certain level (when the basic site density is 2.0 mmol/cm$^3$ or more), $CO_2$, which is a weak acid taken into the cover, can be neutralized by the basic sites of the anion exchange resin and can remain in the anion exchange resin mainly as hydrogen carbonate ions ($HCO_3^-$) or carbamic acid esters (carbamates). As a result, the hydrogen carbonate ions are abundantly stored in the vicinity of the catalyst supported on the carrying body, and the hydrogen carbonate ions become $CO_2$ through an equilibration reaction, whereby $CO_2$ can be efficiently adsorbed to the active sites of the catalyst. Thereby, the $CO_2$ reduction efficiency of the electrode material can be improved. This effect is also effective when the concentration of $CO_2$ supplied is high, and is more effective when the concentration of $CO_2$ supplied is low.

On the other hand, when the basic site density exceeds 5.0 mmol/cm$^3$, there is a concern that the hydrophilicity increases, and thus, the swelling by water ($H_2O$) occurring at the time of the above-mentioned neutralization reaction proceeds and the mechanical properties as electrode material deteriorates.

The basic site density of the anion exchange resin can be adjusted by the ratio of the hydrophobic structure to the hydrophilic structure in the molecular structure of the ionomer. Therefore, the basic site density of the anion exchange resin can be adjusted by copolymerizing a monomer having a hydrophobic structure or a polymer obtained by polymerizing the monomer in advance with a monomer having a hydrophilic structure or a polymer obtained by polymerizing the monomer in advance while adjusting the blending ratio of each of the monomers.

The basic site density of the anion exchange resin is obtained from an integrated value of signals of the amino group, the quaternary ammonium group, and other functional groups serving as the basic sites by 1H-NMR measurement.

The base resin of the ionomer is not particularly limited as long as the effect of the technology according to the present disclosure is not impaired, and for example, the base resin may be a copolymer obtained by copolymerizing an ethylene-based monomer, a styrene-based monomer, a urethane-based monomer, a halogen-based monomer, and a polymer obtained by polymerizing these monomers in advance. As these copolymers, any of a random copolymer, a block copolymer, a graft copolymer, an alternating copolymer and the like can be used. One of these copolymers can be used alone, and a combination of a plurality of these copolymers can be used.

The ionomer according to the present disclosure has an amino group or a quaternary ammonium group, and since these groups are hydrophilic groups, it is preferable to add them to a monomer or a polymer in advance for use in order to adjust the basic site concentration. As the hydrophobic monomer or hydrophobic polymer to be added for adjusting the basic site density, a halide monomer, an aromatic monomer, a monomer containing an ether bond, or a polymer thereof can be used because of its high hydrophobicity, and it is particularly preferable to use a fluorine monomer.

The anion exchange resin covers a part or all of the surface of the carrying body, and the coverage ratio (covered area/carrying body surface area×100), which is the ratio of the covered area to the surface area of the carrying body, can be 70% or more, 80% or more, 90% or more, 95% or more, or 100%. From the viewpoint of the effect of accumulating a large amount of $CO_2$ in the vicinity of the catalyst, it is preferable that the coverage ratio is high. Here, the coverage ratio is an average value of the coverage ratios calculated by the above-described formula by observing the surfaces of 50 randomly selected electrode material particles with a transmission electron microscope.

The average covering thickness of the anion exchange resin is not particularly limited as long as the effect of the technology according to the present disclosure is not impaired, and may be in a range of, for example, 0.01 µm to 100 µm.

When the average covering thickness of the anion exchange resin is 0.01 µm or more, a channel for ion conduction is sufficiently formed, and hydroxide ions ($OH^-$) generated by the reaction can be more efficiently transported to the ion exchange membrane, and further, since the number of basic sites is sufficient, the retention amount of carbonates such as $CO_2$ and hydrogen carbonate ions is sufficient.

In addition, when the average covering thickness of the anion exchange resin is 100 m or less, the distance over which ions must move becomes appropriate, and thus, the resistance to the movement of ions becomes moderate, and an increase in voltage can be suppressed (suppression of a decrease in efficiency). Furthermore, since the distance over which $CO_2$ must diffuse in order to reach the catalyst is not too large, the movement of $CO_2$ becomes easy, and an increase in voltage can be suppressed (suppression of a decrease in efficiency).

As described above, when the average covering thickness of the anion exchange resin is in such a range, it is possible to obtain an electrode material which is excellent in the production efficiency of producing a reduction product (CO or the like) from $CO_2$, and more excellent in the production efficiency of producing the reduction product particularly when the supply concentration of $CO_2$ is low.

2. Production Method of Electrode Material

Next, a production method of electrode material will be described. The carrying body is prepared by mixing predetermined amounts of the conductive carrier and catalyst using a known mixer. The mixing time can be in a range of 3 minutes to 60 minutes. Other methods for preparing the carrying body can include a method of precipitating the catalyst on the conductive carrier by a reduction reaction, etc. More specifically, the catalytic metal can be supported on the conductive carrier by mixing predetermined amounts of the conductive carrier, catalytic metal and reducing agent to reduce the cations. The mixing time according to this method can be in a range of 1 hour to 48 hours.

An ionomer solution, which is a solution of the anion exchange resin that covers the carrying body, is prepared by putting an organic solvent into a container, and putting the anion exchange resin into the container and then dissolving the anion exchange resin. The ionomer concentration of the ionomer solution is in a range of 0.1% to 50% by mass relative to the total mass of the ionomer solution, and the covering thickness and the coverage ratio can be adjusted according to the ionomer concentration of the ionomer solution. The organic solvent used in the ionomer solution is not particularly limited as long as the ionomer can be dissolved in the solvent, and can be freely selected considering the solubility of the ionomer.

The obtained carrying body is added to the prepared ionomer solution and mixed with a mixer or the like to prepare a carrying body dispersion solution in which the carrying body is dispersed in the ionomer solution. The mixing time can be in a range of 5 minutes to 60 minutes.

The carrying body dispersion solution thus obtained is sprayed onto an electrode support such as carbon paper using a known spraying device such as a sprayer and dried to prepare the electrode material attached to the carbon paper or the like. The drying can be performed by natural drying or by using a drying furnace or the like as necessary.

3. Use of Electrode Material

The electrode material according to the present disclosure can be used in electrodes or membrane-electrode assemblies for use in a $CO_2$ electrolytic device.

3-1. Membrane-Electrode Assembly

A membrane-electrode assembly having a high $CO_2$ reduction efficiency can be obtained when the electrode material according to the present disclosure is used to form the membrane-electrode assembly.

The membrane-electrode assembly according to the present disclosure mainly includes the electrode material according to the present disclosure, the solid electrolyte, and the current collector (also referred to as a current collector plate when used in a plate shape). The electrode material according to the present disclosure is provided and used between the solid electrolyte and the current collector. The electrode material can be made into an electrode of a desired shape by forming the electrode material or attaching it to a substrate. The solid electrolyte is an ion exchange membrane, and it is preferable to use an anion exchange membrane.

3-1-1. Solid Electrolyte

The solid electrolyte according to the present disclosure is not particularly limited as long as it does not impair the effect of the technology according to the present disclosure, and examples thereof include cation exchange membranes such as Nafion (registered trademark) and Aquivion (registered trademark) and anion exchange membranes such as Sustainion (registered trademark) and Fumasep (registered trademark), and it is preferable to use an anion exchange membrane. In addition, in the membrane-electrode assembly according to the present disclosure, it is particularly preferable to use an anion exchange membrane having a primary amino group, a secondary amino group, a tertiary amino group, or a quaternary ammonium group, or having a plurality of these ion exchange groups which are mixed together. Specific examples thereof can include NEOSEPTA (registered trademark) ASE, AHA, AMX, ACS, AFN, and AFX (manufactured by Tokuyama Corporation), Selemion (registered trademark) AMV, AMT, DSV, AAV, ASV, AHO, AHT, and APS4 (manufactured by Asahi Glass Co., Ltd.).

The material of the anion exchange membrane may be the same as or different from the material of the anion exchange resin covering the electrode material according to the present disclosure. When the material of the anion exchange membrane is the same material as that of the anion exchange resin covering the electrode material according to the present disclosure, the alteration of the interface between the anion exchange resin and the anion exchange membrane can be avoided, and by avoiding the phase separation at the interface between the anion exchange resin and the anion exchange membrane, the ions can move (be conducted) smoothly, which is preferable.

3-1-2. Current Collector

Examples of the current collector according to the present disclosure include metal materials such as copper (Cu), nickel (Ni), stainless steel (SUS), nickel-plated steel, and brass, and among these, copper is preferable in terms of ease of processing and cost. When the current collector is made of a metal material, examples of the shape of the negative electrode current collector may include a metal foil, a metal plate, a metal thin film, an expanded metal, a punching metal, and a foamed metal.

Figure 2:
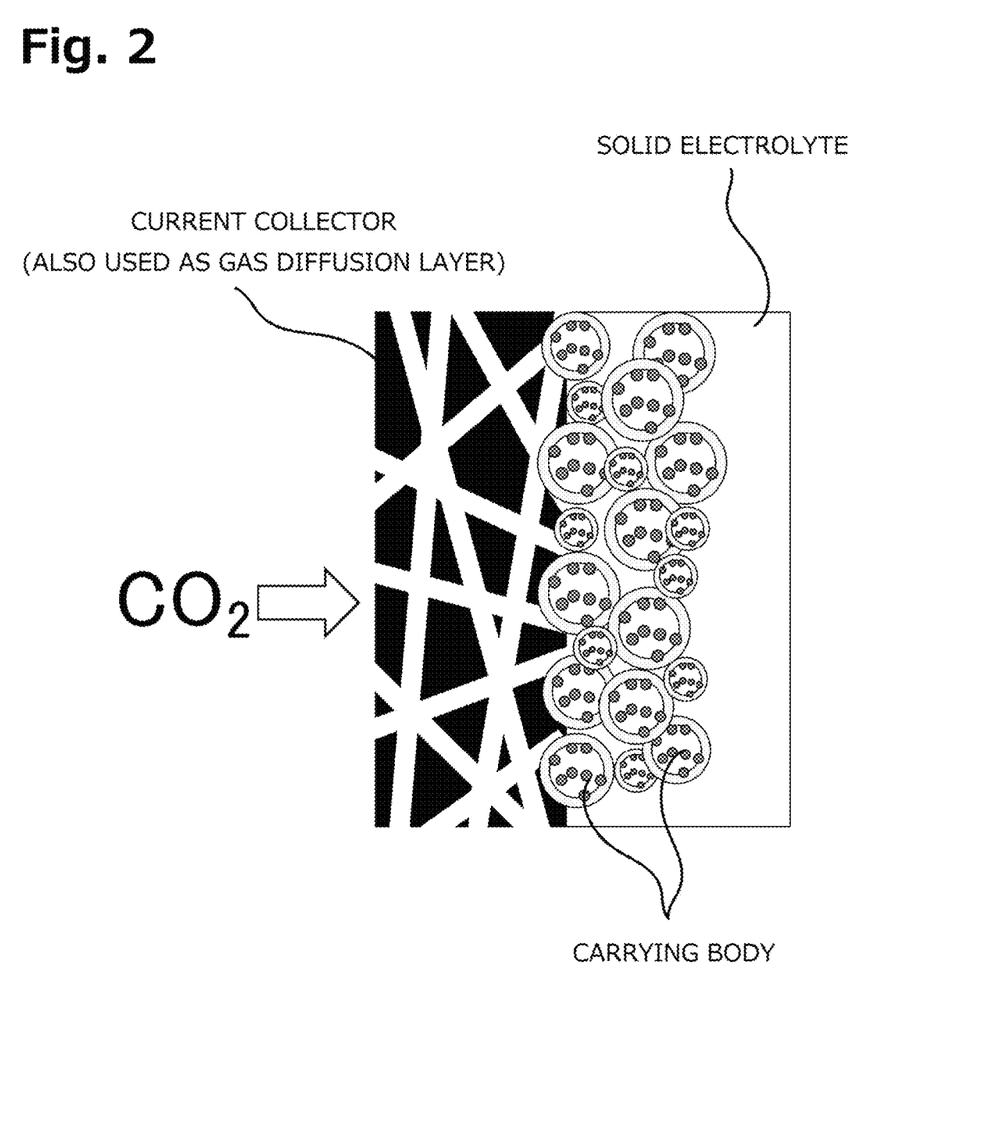
FIG. 2 is an example of a schematic diagram illustrating a membrane-electrode assembly suitably used in the present disclosure.

Here, the current collector is provided with vent holes for supplying and recovering a gas (raw material gas or produced gas) to and from the electrode (or electrode material). These vent holes make it possible to uniformly and efficiently feed the raw material gas to the electrode (or electrode material) and discharge the produced gas (including the unreacted raw material gas). The number, location, and size of the vent holes are not limited and may be set as appropriate. In addition, in the case that the current collector is breathable, no vent hole is required. FIG. 2 is an explanatory diagram of the membrane-electrode assembly, and the current collector in FIG. 2 indicates a current collector using a porous breathable material.

3-2. $CO_2$ Electrolytic Device

When the electrode material and the membrane-electrode assembly according to the present disclosure are used as a cathode, it is possible to obtain a $CO_2$ electrolytic device that is excellent in $CO_2$ reduction efficiency and is more effective particularly when the concentration of the $CO_2$ supplied is low. The $CO_2$ electrolytic device can be used, for example, in a method for producing a $CO_2$ electrolysis product, such as CO.

Figure 3:
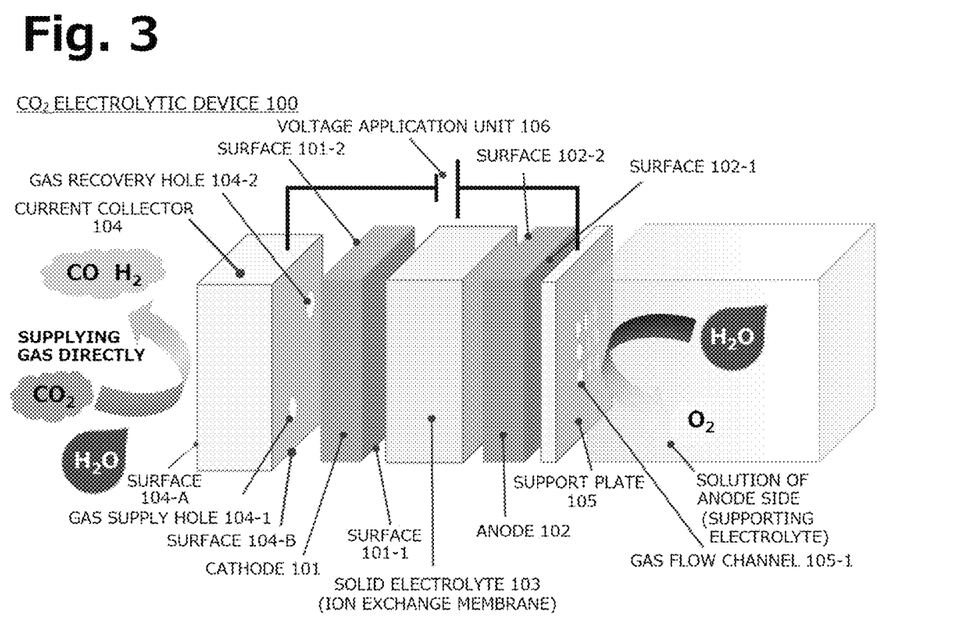
FIG. 3 is an example of a schematic diagram illustrating an example of a $CO_2$ electrolytic device suitably used in the present disclosure.

An example of the $CO_2$ electrolytic device according to the present disclosure will be described with reference to FIG. 3. The $CO_2$ electrolytic device includes a cathode 101, an anode 102 that constitutes a pair of electrodes with the cathode 101, a solid electrolyte 103 that is interposed between the cathode 101 and the anode 102 in a state of being at least partially in contact with each electrode, a current collector 104 having a surface 104-A facing the gas supply and a surface 104-B facing the cathode 101 that is in contact with a surface 101-2 of the cathode 101 opposite to a contact surface 101-1 with the solid electrolyte 103, a support plate 105 that is in contact with a surface 102-1 of the anode 102 opposite to a contact surface 102-2 with the solid electrolyte 103, and a voltage application unit 106 that applies a voltage between the current collector 104 and the support plate 105 (i.e., between the cathode and the anode). Furthermore, $CO_2$ in a gas phase or an aqueous electrolyte solution such as $H_2O$ and $KHCO_3$, etc. serving as a supporting electrolyte is supplied by a supply source and a supply device which are not illustrated. Although the $CO_2$ electrolytic device 100 shown in FIG. 3 is illustrated in a state in which components such as the cathode 101 and the anode 102 are separated from each other for the sake of description, the current collector 104, the cathode 101, the solid electrolyte 103, the anode 102, and the support plate 105 are actually respectively bonded by a predetermined method to be integrated. Each component may be configured to be detachable to constitute one $CO_2$ electrolytic device 100.

Here, the electrode material according to the present disclosure is used as the cathode 101.

The membrane-electrode assembly according to the present disclosure serves as the current collector 104, the cathode 101, and the solid electrolyte 103 of FIG. 3. That is, the current collector constituting the membrane-electrode assembly serves as the current collector 104, the electrode material according to the present disclosure serves as the cathode 101, and the anion exchange membrane constitutes the solid electrolyte 103, thereby forming an integrated cathode.

EXAMPLES

Next, the technology according to the present disclosure will be described in detail with reference to Examples and Comparative Examples, but the technology according to the present disclosure is not limited thereto.

<Preparation of Electrode Material>

Powders obtained by precipitating 2 mg of Ag nanoparticles (average particle diameter of 10 nm) as the catalyst on 10 mg of conductive carbon black (average particle diameter of 30 nm) by reduction of $Ag^+$ ions are mixed using a mixer (apparatus name and processing condition) to prepare a carrying body. The carrying body is dispersed in an ionomer solution prepared by dissolving 6 mg of the ionomer in an organic solvent in a container, and is then applied onto carbon paper (area of 2.25 $cm^2$) using a sprayer to form an electrode.

Here, with respect to the ionomer, various ionomers of the basic site densities shown below are used to prepare the electrodes of the respective examples and comparative examples. The coverage ratio of the electrode material in each of the examples and comparative examples is 100%.

(Raw Materials)

Ionomer of Example 1: the basic site density is 3.8 mmol/$cm^3$, and the substrate is a resin with an aromatic group in the main chain and a quaternary ammonium group (quaternary alkylamine group) and/or a trifluoromethyl group bonded to the main chain as the side chains.

Ionomer of Example 2: the basic site density is 2.9 mmol/$cm^3$, and the substrate is a resin with an aromatic group in the main chain and a quaternary ammonium group (quaternary alkylamine group) bonded to the main chain as the side chain.

Ionomer of Example 3: the basic site density is 2.9 mmol/$cm^3$, and the substrate is a resin with an aromatic ring and an ether bond in the main chain and a quaternary ammonium group (quaternary alkylamine group) bonded to the main chain as the side chain.

Ionomer of Example 4: the basic site density is 4.5 mmol/$cm^3$, and the substrate is a resin with an aromatic group in the main chain and a quaternary ammonium group (quaternary alkylamine group) and/or a trifluoromethyl group bonded to the main chain as the side chains, wherein the basic site density of the ionomer of Example 1 is changed.

Ionomer of Example 5: the basic site density is 2.3 mmol/$cm^3$, and the substrate is a resin with an aromatic ring and an ether bond in the main chain and a quaternary ammonium group (quaternary alkylamine group) bonded to the main chain as the side chain.

Ionomer of Example 6: the basic site density is 2.3 mmol/$cm^3$, XC-2 manufactured by Dioxide Materials Inc.

Ionomer of Example 7: the basic site density is 2.1 mmol/$cm^3$, and the substrate is a resin with an aromatic group in the main chain and a quaternary ammonium group (quaternary alkylamine group) bonded to the main chain as a side chain, wherein the basic site density of the ionomer of Example 2 is changed.

Ionomer of Example 8: the basic site density is 2.9 mmol/$cm^3$, and the substrate is a resin with an aromatic group in the main chain and a quaternary ammonium group (quaternary alkylamine group) bonded to the main chain as the side chain.

Ionomer of Comparative Example 1: the basic site density is 1.4 mmol/$cm^3$, and the substrate is a resin with an aromatic group in the main chain and a quaternary ammonium group (quaternary alkylamine group) bonded to the main chain as a side chain, wherein the basic site density of the ionomer of Example 2 is changed.

Ionomer of Comparative Example 2: the basic site density is 1.0 mmol/$cm^3$, XA-9 manufactured by Dioxide Materials Inc.

<$CO_2$ Electrolytic Device>

The obtained electrode of each of the examples and comparative examples is used as a cathode, a titanium mesh supporting an iridium oxide is used as an anode, and in Examples 1 to 7 and Comparative Examples 1 and 2, the ionomer anion exchange membrane (30 μm thick) of Example 7 is used as a solid electrolyte, and in Example 8, a Nafion (registered trademark) (50 μm thick) cation exchange membrane is used as a solid electrolyte, and an electrolyte bath (aqueous solution of $KHCO_3$, 0.5 M) is used as a solution of anode side, respectively. The cathode, ion exchange membrane, anode, and electrolyte bath are arranged in this order, and the ion exchange membrane and the anode are sandwiched between the cathode and the electrolyte bath.

<Electrolytic Performance Evaluation>

The CO production current density $J_{CO}$ [mA/cm$^2$] is measured when $CO_2$ is electrolyzed into CO using the $CO_2$ electrolytic device in which the respective electrodes of the examples and comparative examples are incorporated. $CO_2$ is supplied to the cathode using $N_2$ gas as a dilution gas with $CO_2$ concentrations being 100 vol % and 25 vol %. The applied potential of the cathode is −1.8 V with respect to a silver/silver chloride reference electrode. The results are shown in Table 1. The retention rate is evaluated according to the following evaluation criteria.

(Evaluation Criteria)

⊙: $J_{CO}$ is 65 mA/cm$^2$ or more when $CO_2$ is supplied at a concentration of 100 vol %, and the retention rate of $J_{CO}$ at the time when $CO_2$ is supplied at a concentration of 25 vol % is 50% or more as compared with $J_{CO}$ at the time when $CO_2$ is supplied at a concentration of 100 vol %.

○: the retention rate of $J_{CO}$ at the time when $CO_2$ is supplied at a concentration of 25% is 40% or more as compared with $J_{CO}$ at the time when $CO_2$ is supplied at a concentration of 100 vol %.

Δ: the retention rate of $J_{CO}$ at the time when $CO_2$ is supplied at a concentration of 25 vol % is less than 40% as compared with $J_{CO}$ at the time when $CO_2$ is supplied at a concentration of 100 vol %.

TABLE 1

| | | Supply Concentration of $CO_2$: 100 vol % | Supply Concentration of $CO_2$: 25 vol % | | |
|---|---|---|---|---|---|
| | Basic Site Density of Ionomer [mmol/cm$^3$] | CO Production Current Density $J_{CO}$ [mA/cm$^2$] | CO Production Current Density $J_{CO}$ [mA/cm$^2$] | Retention Rate of $J_{CO}$ as Compared with $J_{CO}$ at $CO_2$ Supply Concentration of 100 vol % | Property Evaluation |
| Example 1 | 3.8 | 120 | 60 | 50% | ⊙ |
| Example 2 | 2.9 | 110 | 55 | 50% | ⊙ |
| Example 3 | 2.9 | 65 | 40 | 62% | ⊙ |
| Example 4 | 4.5 | 65 | 30 | 46% | ○ |
| Example 5 | 2.3 | 70 | 30 | 43% | ○ |
| Example 6 | 2.3 | 60 | 35 | 58% | ○ |
| Example 7 | 2.1 | 75 | 30 | 40% | ○ |
| Example 8 | 2.9 | 35 | 20 | 57% | ○ |
| Comparative Example 1 | 1.4 | 60 | 20 | 33% | Δ |
| Comparative Example 2 | 1.0 | 45 | 15 | 33% | Δ |

REFERENCE SIGNS LIST

1 Electrode material
10 Conductive carrier
11 Catalyst (active site)
12 Ion exchange resin
100 $CO_2$ electrolytic device
101 Cathode
101-1 Surface in contact with solid electrolyte of cathode
101-2 Surface in contact with current collector of cathode
102 Anode
102-1 Surface in contact with support plate of anode
102-2 Surface in contact with solid electrolyte of anode
103 Solid electrolyte
104 Current collector
104-1 Gas supply hole of current collector
104-2 Gas recovery hole of current collector
105 Support plate
105-1 Gas flow channel of support plate
106 Voltage application unit

The invention claimed is:

1. An electrode material, comprising:
a plurality of carrying bodies formed such that each of the carrying bodies comprises a conductive carrier and a plurality of catalyst particles supported by the conductive carrier; and
an anion exchange resin comprising an ionomer and formed on the plurality of carrying bodies such that 70% or more of a surface of each of the carrying bodies is covered by a layer of the anion exchange resin and that the ionomer comprises at least one group selected from the group consisting of a primary amino group, a secondary amino group, a tertiary amino group, and a quaternary ammonium group,
wherein the plurality of catalyst particles includes at least one of a metal complex, a metal, and an inorganic compound, and the ionomer of the ion exchange resin has a basic site density in a range of 2.0 mmol/cm$^3$ to 5.0 mmol/cm$^3$.

2. The electrode material according to claim 1, wherein the basic site density of the ionomer is 2.5 mmol/cm$^3$ or more and less than 4.5 mmol/cm$^3$.

3. The electrode material according to claim 1, wherein the plurality of carrying bodies formed such that the conductive carrier in each of the carrying bodies has a particulate form.

4. The electrode material according to claim 3, wherein the plurality of carrying bodies formed such that the conductive carrier in each of the carrying bodies has an average particle diameter in a range of 10 nm to 1000 μm.

5. The electrode material according to claim 1, wherein the plurality of carrying bodies formed such that the conductive carrier in each of the carrying bodies has a staple fiber form.

6. The electrode material according to claim 5, wherein the plurality of carrying bodies formed such that the conductive carrier in each of the carrying bodies has an average fiber length in a range of 10 nm to 1000 μm.

7. The electrode material according to claim 5, wherein the plurality of carrying bodies formed such that the plurality of catalyst particles in each of the carrying bodies has an average particle diameter in a range of 0.001 μm to 100 μm.

8. The electrode material according to claim 1, wherein the basic site density of the ionomer is 2.9 mmol/cm$^3$ or more and less than 4.5 mmol/cm$^3$.

9. The electrode material according to claim 1, wherein the plurality of carrying bodies formed such that an amount of the catalyst particles in each of the carrying bodies is in a range of 10% by mass to 70% by mass with respect to 100% by mass of a total amount of a respective one of the carrying bodies.

10. The electrode material according to claim 1, wherein the plurality of carrying bodies formed such that an amount of the catalyst particles in each of the carrying bodies is in a range of 20% by mass to 60% by mass with respect to 100% by mass of a total amount of a respective one of the carrying bodies.

11. The electrode material according to claim 1, wherein the plurality of carrying bodies formed such that an amount of the catalyst particles in each of the carrying bodies is in a range of 30% by mass to 50% by mass with respect to 100% by mass of a total amount of a respective one of the carrying bodies.

12. The electrode material according to claim 1, wherein the plurality of carrying bodies formed such that the conductive carrier in each of the carrying bodies comprises at least one of a carbon material, titanium, tantalum, gold, silver and copper.

13. The electrode material according to claim 1, wherein the anion exchange resin is formed such that the layer of the anion exchange resin on each of the carrying bodies has an average covering thickness in a range of 0.01 μm to 100 μm.

14. A membrane-electrode assembly, comprising:
the electrode material of claim 1;
an ion exchange membrane; and
a current collector positioned such that the electrode material is formed between the ion exchange membrane and the current collector.

15. The membrane-electrode assembly according to claim 14, wherein the ion exchange membrane is an anion exchange membrane.

16. The membrane-electrode assembly according to claim 15, wherein a material of the ion exchange membrane is the same as the anion exchange resin of the electrode material.

17. A $CO_2$ electrolytic device, comprising:
the electrode material of claim 1.

18. A method for producing a $CO_2$ electrolysis product, comprising:
supplying $CO_2$ to the $CO_2$ electrolytic device according to of claim 17; and
electrolyzing the $CO_2$ within the $CO_2$ electrolytic device such that the electrolysis product is obtained,
wherein the $CO_2$ electrolytic device includes a cathode comprising the electrode material.

19. A $CO_2$ electrolytic device, comprising:
the membrane-electrode assembly of claim 14.

20. A method for producing a $CO_2$ electrolysis product, comprising:
supplying $CO_2$ to the $CO_2$ electrolytic device of claim 19; and
electrolyzing the $CO_2$ within the $CO_2$ electrolytic device such that the electrolysis product is obtained,
wherein the membrane electrode assembly is a cathode of the $CO_2$ electrolytic device.

* * * * *